United States Patent [19]

Keckeisen

[11] Patent Number: 5,655,694
[45] Date of Patent: Aug. 12, 1997

[54] LUGGAGE HOLDER FOR SADDLES, IN PARTICULAR FOR BICYCLES

[76] Inventor: Karl J. Keckeisen, Hans Jakob Str. 10, Friedrichshafen D-38048, Germany

[21] Appl. No.: 605,090

[22] PCT Filed: Sep. 6, 1994

[86] PCT No.: PCT/DE94/01018

§ 371 Date: Apr. 29, 1996

§ 102(e) Date: Apr. 29, 1996

[87] PCT Pub. No.: WO95/07205

PCT Pub. Date: Mar. 16, 1995

[30] Foreign Application Priority Data

Sep. 7, 1993 [DE] Germany .................. 43 30 247.5

[51] Int. Cl.$^6$ .................. B60R 9/00; B60R 9/10
[52] U.S. Cl. .................. 224/430; 224/431; 224/429; 224/428; 224/448; 224/275; 297/688.12
[58] Field of Search .................. 224/430, 429, 224/428, 427, 421, 420, 431, 32 R, 275, 448; 297/188.01, 195.1, 188.12

[56] References Cited

U.S. PATENT DOCUMENTS 4,440,332 4/1984 Kullen .................. 224/36
4,566,617 1/1986 Jackson .................. 224/275
4,643,343 2/1987 Goldman et al. .................. 224/275

FOREIGN PATENT DOCUMENTS 413 106 2/1991 European Pat. Off. .

Primary Examiner—Henry J. Recla
Assistant Examiner—Kam R. Shah
Attorney, Agent, or Firm—Lowe, Price, LeBlanc & Becker

[57] ABSTRACT

A simply formed and easily mountable luggage holder, in particular for bicycles, having a luggage container in driving direction removably mounted on back of and/or underneath the saddle. The luggage holder for is provided with a fastening part holding the luggage container, and a longitudinal beam fastened underneath the saddle with a receptacle for receiving said fastening part, said receptacle (4) being tubular shaped, the longitudinal axis of said tubular receptacle (4) being inclined downward in driving direction, the longitudinal beam (3) with its luggage-sided end part (14) being fastened with its rear section to at least one saddle spring (7), and additionally being fastened with its opposite end part (13) underneath or behind the fastening head (5) of the saddle pillar (6).

14 Claims, 3 Drawing Sheets

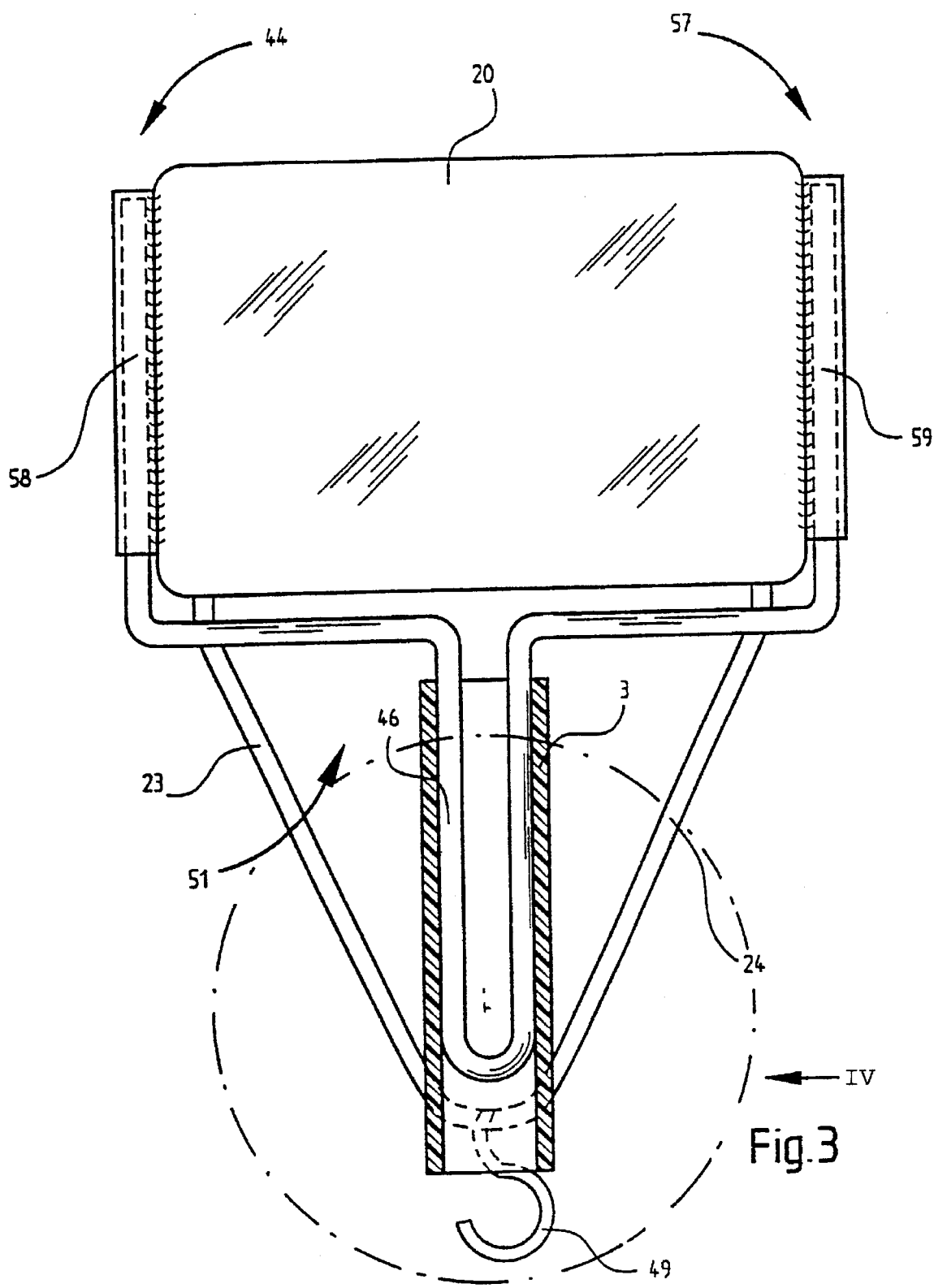

5,655,694

LUGGAGE HOLDER FOR SADDLES, IN PARTICULAR FOR BICYCLES

TECHNICAL FIELD

The invention relates to a luggage holder, in particular for bicycles, for fastening a luggage container, being provided with a fastening part holding the luggage container, and a longitudinal beam fixed below the saddle and having a receptacle for inserting the fastening part, said receptacle being tubular shaped and its longitudinal axis being inclined downward in driving direction, and the longitudinal beam with its luggage-side end part on the rear section being fastened to at least one saddle spring.

PRIOR ART

The closest prior art upon which the preamble of the main claim is based, is described in U.S. Pat. No. 4,566,617 in which a saddle seat pack assembly for a bicycle is disclosed which shows the features as stated in the above paragraph. The seat pack is thereby substantially accommodated underneath the saddle. Therefore it must not jut out laterally from underneath the saddle because in such case the cyclist would be hampered while pedalling.

From U.S. Pat. No. 4,643,343 a saddlebag has been known which is attachable to a fixture part underneath the saddle by means of a holder made of flat stock. Although the holder of the saddlebag may be pushed into the fixture part easily respectively pulled out of it, there is however the danger that it will detach unintentionally unless the bag is fastened additionally to the bicycle frame. Moreover, no lateral guidance for the saddlebag is guaranteed.

DESCRIPTION OF THE INVENTION

It is the object of the invention to provide a simple formed and easily mountable luggage holder by means of which a luggage container may be attached behind the saddle in driving direction, so that it does by no means hamper the cyclist, and may easily be fastened and detached but is secured against an inadvertent detachment.

In accordance with the invention the object is obtained by the characteristics as shown in claim 1.

The invention presents the advantages with respect to prior art that the luggage holder which is mounted at the back or underside of the saddle respectively is very lightweight and yet is able to carry also heavy luggage containers such as a knapsack. Due to the possibility of fastening a beam underneath the saddle the beam is almost inconspicuous and adapts to nearly every type of saddle due to a simple mounting. In consequence of the inclined insertion with respect to the horizontal line, an additional locking of the fastening part associated with the luggage container as such is not necessary because the luggage container holds itself in the longitudinal beam due to the force of gravity and friction. An advantageous shaping of the fastening part for the luggage container keeps the latter dimensionally stable. Such advantageous embodiment is characterized in that the fastening part has the shape of a fork with spaced apart free prongs which engage into the luggage container.

Fork-shaped fastening parts which engage with the free prongs into lugs a luggage container for bicycles have been known from EP-A-0 413 106 and U.S. Pat. No. 4,440,332.

Advantageous embodiments of the invention are shown in the subclaims and the following description.

In the following the invention will be described in further details taking reference to embodiments which are in particular explained by means of the enclosed drawings in which FIG. 1 is a sectional view through an embodiment of the luggage holder with a luggage container mounted to the underside of a bicycle saddle;

FIG. 3 is a sectional view along a line III—III in FIG. 1 through the longitudinal beam in a scale which is enlarged with respect to the FIG. 1, with the luggage container and its associated mounting part;

Figure 1:
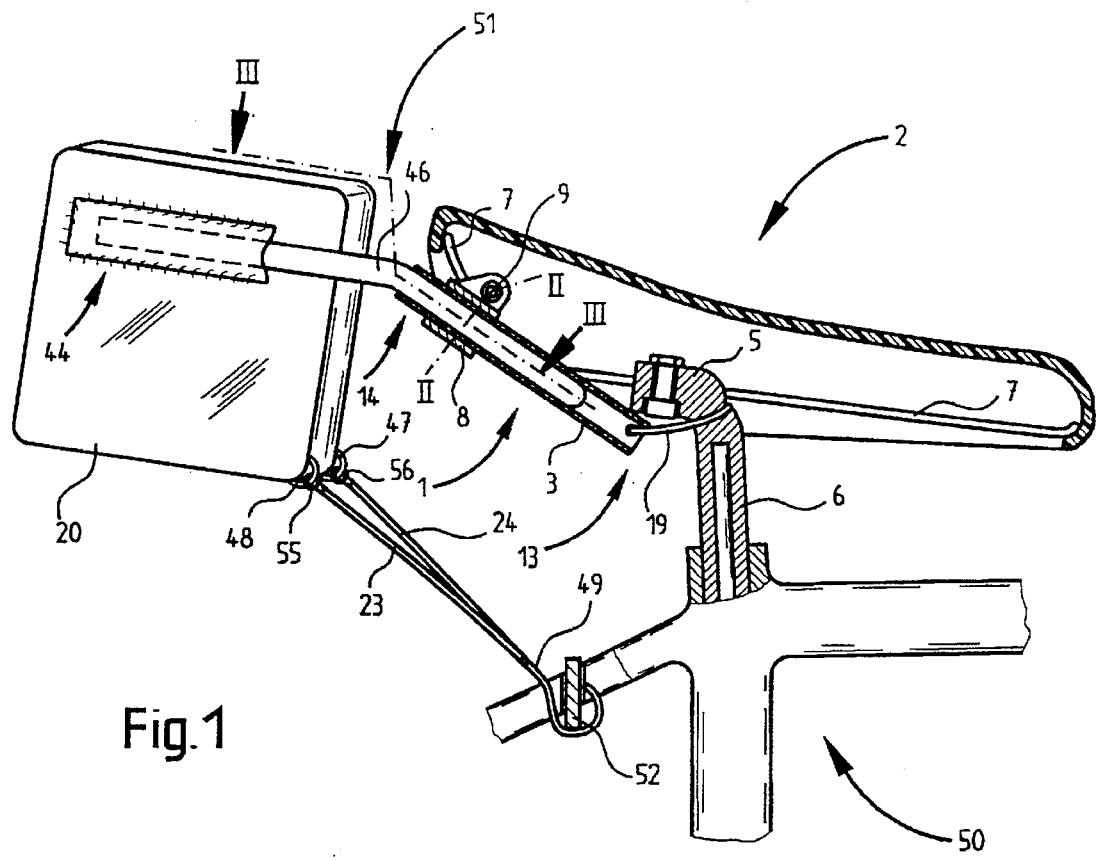
Figure 2:
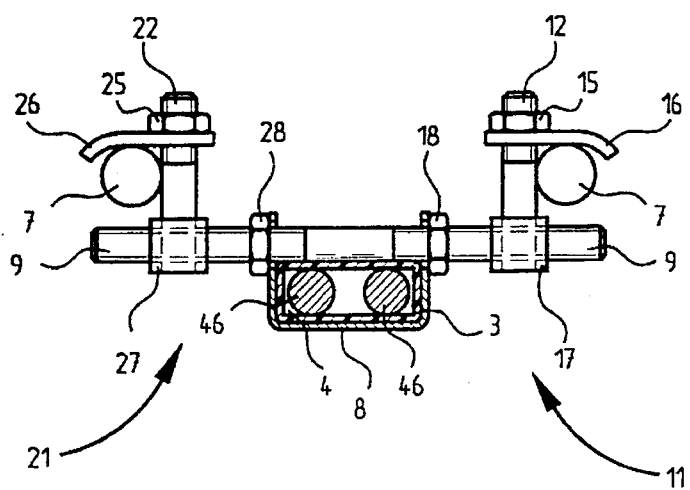
FIG. 2 is a sectional view along a line II—II in FIG. 1 through the mounted luggage holder without saddle in a scale which is enlarged with respect to the illustration in FIG. 1.

The luggage holder 1 (FIG. 1) is meant to be mounted underneath a saddle 2. A longitudinal beam 3 has a tubular receptacle 4 for a fastening part 51 for holding a luggage container 20. The saddle-sided end part 13 of the longitudinal beam 3 is located underneath a fastening head 5 of a seat pillar 6 of the saddle 2 and abuts against the seat pillar 6 at least when the fastening part 51 is inserted.

The luggage-sided end part 14 of the longitudinal beam 3 is fixed due to the mounting method in an inclined position with respect to the horizontal line in the high position by means of a frame 8 (FIG. 1, 2). Said frame 8 is firmly connected with a crossbeam 9. On both sides of the said frame 8 one nut 18, 28 screwed each on the crossbeam 9 presses against the clamp 8 so that same is immovably fixed upon the-crossbeam 9 thus holding the longitudinal beam 3. The nuts 18, 28 are preferably stop nuts. Crossbeam holders 11, 21 are slipped on both ends of the crossbeam 9. The crossbeam holders 11, 21 are provided with stud bolts 12, 22 transversally to bushings 17, 27 of the crossbeams 11,21. On the stud bolts 12, 22 there is located each a stretching clamp 16, 26 with one nut 15, 25 each. Thereby the luggage holder 1 is fastened to the saddle springs 7.

The crossbeam 9 turns freely in the crossbeam holders 11, 21. The frame 8 is slideable relative to the longitudinal beam 3 parallel with the longitudinal axis of the receptacle 4 until the end of the mounting process and is then clamped to the longitudinal beam 3 by tightening the nuts 18, 28.

The saddle-sided end 13 of the longitudinal beam 3 is fixed to the seat pillar 6 by means of a detachable flexible holding strap 19 which is wound around the fastening head 5 of the seat pillar 6.

The holding strap 19 consists either of metal or of plastic material.

The longitudinal beam 3 consists either of metal or of plastic material.

The fastening part 51 consists substantially of bent rod and has the shape of a holding fork. Said holding fork is provided with spatially distant prongs 58, 59. They engage into lugs 44, 57 which are provided on the luggage container 20, preferably on opposite sides of the luggage container 20. The other end of the fastening part 51 is shaft-like. The shaft 46 of the fastening part 51 rests against its lateral sides—if inserted into the receptacle 4 of the longitudinal beam 3.

Due to the inclined position of the luggage holder 1, the luggage container 20 and the fastening part 51 respectively need not be additionally fixed to the longitudinal beam 3, because the fastening part 51 is held in the longitudinal beam 3 due to the force of gravity and friction.

Figure 3A:
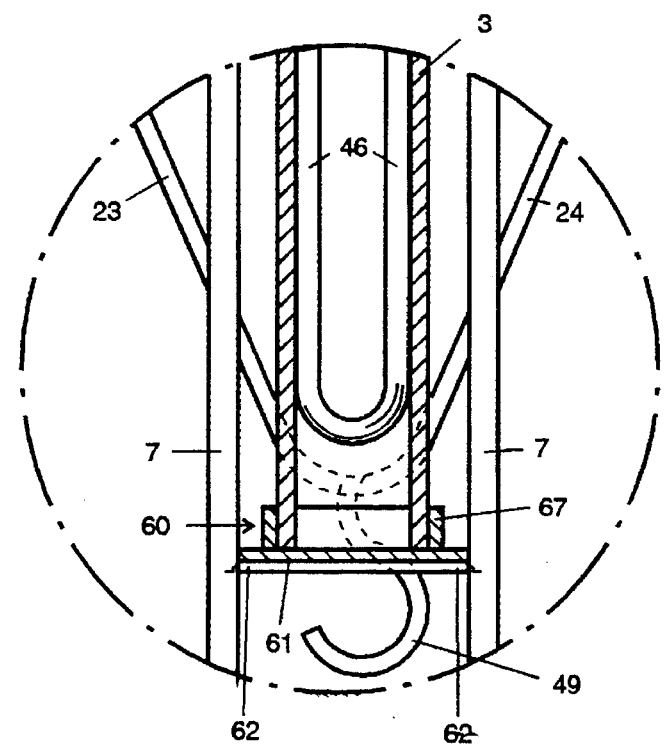
FIG. 3a shows the cutout shown in FIG. 3 and encircled by the circle IV with another embodiment of the longitudinal beam in which its lower end is fastened also to the saddle springs by means of a fixed support.

In another embodiment of the luggage holder in accordance with the invention, a fixed support 60 is provided on the lower end of the longitudinal beam 3, which, as shown in FIG. 3a, may be tied between the saddle springs 7. The end piece 61 of the fixed support 60 averted from the longitudinal beam 3 is provided with two wings 62 which jut out horizontally over the built-in longitudinal beam 3 on both sides. The ends of the wings 62 form each two noses 63 which frame each a U-shaped groove 64 which opens towards the wing ends. The grooves 64 are dimensioned so that they are able to surround partly the saddle springs 7. The distance between the two grooves 64 is such that the fixed support 7 assembled between the saddle springs 7 is pinched-in with the wings 62. The normal on the side of the holding support 60 averted from longitudinal beam 3 is tilted upward with respect to the longitudinal axis of the longitudinal beam 3 and the extension of the grooves 64 is parallel with respect to the above normal. The inclination of the normal with respect to the longitudinal axis is determined by the angle which the longitudinal beam 3 and the saddle spring 7 form with one another in the vertical of the place where the holding support 60 is pinched in.

Figure 4A:
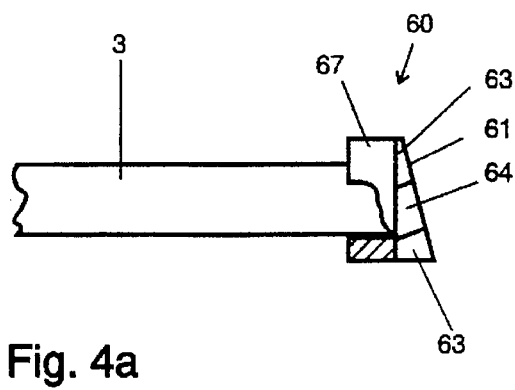
FIG. 4a through 4c are various views of an embodiment of the fixed support.
Figure 4B:
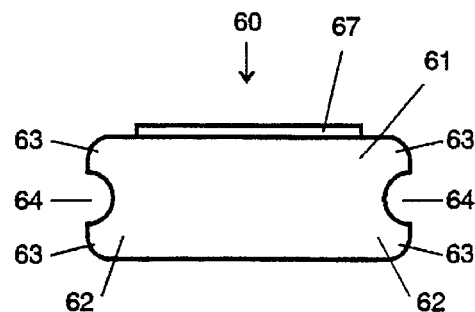
Figure 4C:
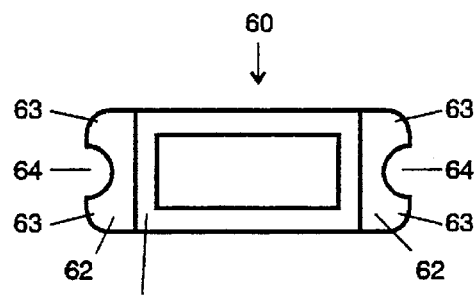

The holding support 60 may be one integral part with the longitudinal beam 3 or, as shown in FIG. 3a, be slipped on the longitudinal beam 3. The shape which is slipped on is illustrated also in FIGS. 4a through 4c. FIG. 4a shows the fixed support 60 slipped on the longitudinal beam 3 (in a partly sectioned) lateral view. FIG. 4b shows the view on the side of the end piece 61 averted from the longitudinal beam 3, and FIG. 4c shows the view on the end of part 67 which is slipped upon the longitudinal beam 3. The part 67 which changes over into the end piece 61, is cylindrical-shaped, its inner cross section corresponding to the outer cross section of the longitudinal beam 3. The end piece 61 is provided with the above described wings 62 which horizontally jut out over the part 67. The holding support 60 consists preferably of metal or plastic material.

On inserting the slipped-on fixed support 60 during assembly of the longitudinal beam 3, at first the holding support 60 with the wings 62 is pinched between the two saddle wings 7—i.e. into their section which is situated directly behind the fastening head 5—so that the grooves 64 surround the saddle springs 7 and the open end of part 67 averted from end piece 61 is directed toward the luggage side. Due to its shape harmonized with the shape of the saddle springs 7, the open end thereby points inclined upwards. Then the longitudinal beam 3 is entered into the open end of part 67 with its end 13 averted from the luggage side, if need be, assisted by light blows with a hammer. Subsequently also the luggage-sided end 14 of the longitudinal beam 3 is fixed to the saddle springs 7 by means of the frame 8, of the crossbeam 9 fastened to it, and the crossbeam holders 17, 27 by means of the stretching clamps 16 and 26.

The support 60 improves the fixing of the longitudinal beam 3 to the saddle 2 and therewith the stability of the luggage holder altogether. It may be used in addition to or instead of the holding strap 19.

For a further increase of the safety of the anchorage of the luggage container—as shown in FIGS. 1 and 3—one or a plurality of hooks 47, 48 are provided in its lower part. Ears 55, 56 are hooked into the hooks 47, 48, which belong to connecting elements 23, 24, e.g. in the form of rubber tapes or cords which are united at their respective opposite ends into a common hook 49. This latter serves for being hooked into the ledge between the rear construction struts of the bicycle frame 50, e.g. of a racing bicycle or a mountainbike with which the luggage holder according to the invention is preferably used.

In particular on occasion of cross country trips such elastic support of the luggage container 20 and a thereby safe fastening to the bicycle proves to be advantageous, as opposed to a rigid support such as a luggage carrier.

The luggage container 20 is preferably a saddlebag or a knapsack. It may either be detached from the bicycle together with the fastening part 51 or immediately be drawn off the fastening part 51.

I claim:

1. Luggage holder, in particular for bicycles having a saddle with saddle springs mounted on a fastening head of a saddle pillar, for fastening a luggage container thereto, said holder being provided with a longitudinal beam having one end adapted to be fastened to one of said fastening head or at least one of said saddle springs underneath or behind the fastening head (5) of the saddle pillar (6) and a fastening part having a distal and a proximal end in regard to the longitudinal beam with the distal end being adaptable to secure the luggage container said longitudinal beam having a receptacle at the other end thereof for inserting the fastening part, said receptacle being shaped tubular and its longitudinal axis being inclined downward in driving direction, and the longitudinal beam being adapted to be fastened at the other end thereof to a rear section of at least one saddle spring, whereby the luggage container (20) is disposed behind the longitudinal beam in said driving direction.

2. Luggage holder as claimed in claim 1, characterized in that the said receptacle (4) has a rectangular cross section orthogonal with respect to the longitudinal axis.

3. Luggage holder as claimed in claim 1, characterized in that the said fastening part (51) has the form of a preferably one-piece—holding fork with spatially distant free prongs (58, 59) which engage into the luggage container.

4. Luggage holder as claimed in claim 3, characterized in that the free prongs (58, 59) of the said fastening part (51) engage into lugs (44, 57) which are provided on the luggage container (20).

5. Luggage holder as claimed in claim 1, characterized in that said proximal end of the fastening part (51) is made in the form of a shaft (46) which is preferbly dimensioned so that it rests against the lateral sides of the longitudinal beam (3)—when inserted into the tubular receptacle (4).

6. Luggage holder as claimed in claim 1 characterized in that the other end of said longitudinal beam (3) is fastened to said spring at least one by means of a frame (8) partly embracing it, to a crossbeam (9) which is rotatably supported in crossbeam holders (11, 21) which, in turn, are clamped to said at least one saddle spring (7).

7. Luggage holder as claimed in claim 6, characterized in that the said frame (8) is slideably parallel to the longitudinal axis of the receptacle (4) relative to the longitudinal beam (3) until the assembly is completed, and is clamped to the longitudinal beam (3) when in inserted condition.

8. Luggage holder as claimed in claim 6, characterized in that the crossbeam (9) is fixed to at least one saddle spring 7) by means of stretching clamps (16, 26).

9. Luggage holder as claimed in claim 1 characterized in that the longitudinal beam (3) is fastened with its end part (1) with a, flexible holder to the saddle pillar (6).

10. Luggage holder as claimed in claim 9, characterized in that the said holder is a flexible holding strap (19) preferably consisting of metal or plastic material which preferably is firmly bound around the saddle pillar (6) with its fastening head (5).

11. Luggage holder as claimed in claim 1 characterized in that a connecting element (23, 24) preferably consisting of rubber band or a rubber cord is provided for further fastening of the luggage container.

12. Luggage holder as claimed in claim 1 characterized in that a fixed support (60) is provided at said one end of the longitudinal beam (3) for mounting to said at least one saddle spring (7).

13. Luggage holder as claimed in claim 12, characterized in that the fixed support (60) consists preferably of metal or plastic material and preferably is made in one integral piece with the longitudinal beam (3) or slidably mounted to said longitudinal beam, said fixed support is provided with two wings (62) which jut out from the (mounted) longitudinal beam (3) and, at the ends of each said wings (62) a groove (64) is provided each opening toward the end of said wing, said grooves being dimensioned so that they are able to partly embrace the saddle springs (7), and being so spaced from one another that the space between them is slightly larger than that between the saddle springs (7).

14. Luggage holder as claimed in claim 1 characterized in that the luggage container is disposed behind the saddle in said driving direction.

* * * * *

UNITED STATES PATENT AND TRADEMARK OFFICE
CERTIFICATE OF CORRECTION

PATENT NO. : 5,655,694

DATED : August 12, 1997

INVENTOR(S) : Karl J. KECKEISEN

Page 1 of 2

It is certified that error appears in the above-identified patent and that said Letters Patent is hereby corrected as shown below:

On the title page, [item 76] should read as follows:

--[76]   Inventor: Karl J. Keckeisen, Hans Jakob Str. 10, Friedrichshafen D-88048, Germany--

On the title page, item [57], line 4
In the Abstract:
   After "holder", please delete the word "for".

Column 2, line 33, delete "the-crossbeam" and insert --the crossbeam--.

Claim 6, column 4, line 44, after "said" insert --at least one--.

UNITED STATES PATENT AND TRADEMARK OFFICE
CERTIFICATE OF CORRECTION

PATENT NO. : 5,655,694
DATED : April 29, 1996
INVENTOR(S) : Karl J. KECKEISEN

It is certified that error appears in the above-identified patent and that said Letters Patent is hereby corrected as shown below:

Claim 9, column 4, line 57, delete "(1)" and insert --(13)--;

line 58, after the word "a", delete the comma.

Signed and Sealed this

Tenth Day of March, 1998

Attest:

BRUCE LEHMAN

Attesting Officer     Commissioner of Patents and Trademarks